3,174,912
PURIFICATION OF FORMALDEHYDE
Walter E. Heinz, Frankfurt am Main, Germany, assignor to Celanese Corporation of America, New York, N.Y., a corporation of Delaware
No Drawing. Continuation of application Ser. No. 69,296, Nov. 15, 1960. This application July 24, 1964, Ser. No. 385,066
12 Claims. (Cl. 202—42)

This is a continuation of U.S. Serial No. 69,296, filed November 15, 1960, and now abandoned.

This invention relates to purification of formaldehyde and relates more particularly to purification of formaldehyde obtained by the partial oxidation of hydrocarbons.

It is an object of this invention to provide a novel process for the purification of formaldehyde.

Another object of this invention is the provision of a new and efficient method for obtaining highly pure formaldehyde of low water content.

Other objects of this invention will be apparent from the following detailed description and claims, in which all proportions are by weight unless otherwise stated.

In accordance with one aspect of this invention, vapors comprising formaldehyde and water are passed into a fractional distillation column where they are brought into contact with liquid acetone. This distillation column, hereinafter termed an "acetone entrainment column," is operated in such a manner that the overhead stream is a mixture of acetone and formaldehyde while the residue stream is a mixture comprising formaldehyde, water and some acetone, the ratio of formaldehyde to water in the residue stream being less than that in the overhead stream. This residue stream is then preferably returned to the concentration zone. For the most advantageous results, the vapors are produced by treating an aqueous solution of formaldehyde in a concentration zone to produce vapors in which the ratio of formaldehyde to water is at least about 1 to 10.

A simplified flow diagram of the method is as follows:

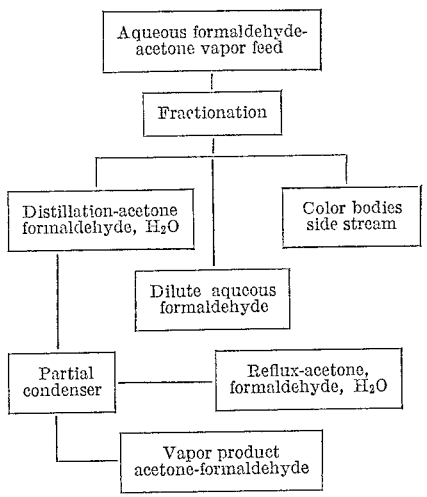

The process of this invention makes it possible to remove impurities which adversely affect the quality of the formaldehyde. Thus, such impurities (present in the dilute aqueous formaldehyde obtained in the partial oxidation of hydrocarbons, e.g., by the method described by Dice U.S. Patent 2,570,215) tend to remain with the formaldehyde during preliminary steps of distilling and concentration and appear in the vapors obtained in the aforesaid concentration zone. While the impurities are present in very small amounts, the presence has a significant and undesirable effect on the bromine number of the resulting formaldehyde.

In addition, the process of this invention makes possible the product of formaldehyde of a very low water content. Another benefit derived from the use of this process is that it makes possible the removal of color bodies and other impurities which may distill off with formaldehyde and appear in the vapors produced in concentration zone under certain conditions of temperature and pressure.

In one advantageous process the concentration zone comprises a distillation column hereinafter called the pressure column operated under superatmospheric pressure and equipped with a partial condenser into which the vapors from the top of the column are fed. The aqueous formaldehyde, after removal of light ends such as acetaldehyde and methanol overhead, is fed continuously to an intermediate point on this pressure column, while a liquid comprising acetone is supplied to the top of the pressure column. There are obtained from the partial condenser vapors containing a major proportion of acetone, together with water and formaldehyde. Water, containing a small amount of formaldehyde, is removed continuously from the base of the column. The vapors from the partial condenser are then fed to an intermediate zone on a second distillation column equipped with a partial condenser into which the vapors from the top of column are fed. The second column is operated at substantially atmospheric pressure or slightly above, e.g., 0 to 8 p.s.i.g. and serves as the acetone entrainment column. This column is operated under reflux, and (after the initial line-out period to establish steady state conditions) substantially all the liquid acetone therein is supplied by the condensation of the acetone furnished by the feed vapors. This condensation takes place within the column itself and in the partial condenser of said column. There is taken from the base of the column a liquid stream of water containing some formaldehyde and some acetone. This liquid stream is returned to the concentration zone, by combining it with the feed or the acetone being fed to the pressure column. From the condenser of the acetone entrainment column there are obtained vapors of acetone and formaldehyde and very little, if any, water. These vapors may be used, as such, or converted to aqueous formaldehyde by replacement of the acetone with water. The aqueous formaldehyde thus obtained is of high purity. The condensate formed in the entrainment column partial condenser is principally acetone with a small portion of water and formaldehyde. A portion of this condenate is returned to the entrainment column.

As pointed out above, it is convenient to operate the acetone entrainment column at about atmospheric pressure. At this pressure the top temperature of this column will be about 53 to 56° C. If desired the entrainment column may be operated at slightly higher pressures, to provide top temperatures of up to about 70° C. for instance at 8 p.s.i.g.

Advantageously, the vapors passing through the entrainment tower partial condenser are reduced in temperature by about 5 to 20° C. The condenser is preferably operated at atmospheric pressure, at which pressure the operating temperature of the partial condenser is preferably below the boiling point of acetone and most preferably at a temperature from about 48° to about 52° C. The preferable temperature range will increase slightly with increased operating pressures. It should be understood that the process of this invention will operate most advantageously when the condenser condenses sufficient acetone which is then recycled to the entrainment column to maintain an acetone formaldehyde mole ratio effluent from said condenser of at least 1:1 and most preferably a mole ratio of from 1 to 3 moles of acetone per mole of formaldehyde. The proportion of this condensate which is returned to the top of the entrainment column is also relatively large, the ratio of liquid acetone so returned to formaldehyde being fed to the column being advantageously at least 15:1 preferably from 15:1 to 20:1. The amount of acetone being fed to the entrainment column must be sufficiently great to maintain the point at which the formaldehyde vapor is fed at a temperature below 70° C. at about atmospheric pressure. Where the ratio of acetone fed to formaldehyde fed falls below 15:1, the temperature of the point of the formaldehyde vapor feed goes above 70° C., reducing the proportion of the formladehyde recovered from the column.

In addition, it has been found that when the concentration zone (e.g., the pressure column and its partial condenser) operate under such conditions as to produce a vapor having a temperature above 100° C. at a pressure of 40 p.s.i.g., color bodies present in formaldehyde as well as methanol and other volatile impurities tend to appear in the vapors produced. These color bodies and impurities tend to concentrate in the entrainment column at a point below the vapor feed point of said column. They can be removed from the system by taking off a small continuous sidestream (e.g., about 0.5 to 5.0% of the weight of the formaldehyde and water mixture fed to the entrainment column, at the point where the color bodies concentrate which is at or below about the breakpoint of the entrainment column. If desired, this sidestream may be then recycled into the original formaldehyde mixture prior to the removal of light ends, and then, during the removal of light ends, most of the color bodies and impurities will be removed overhead or the formaldehyde may be recovered by any conventional methods from this sidestream.

The entrainment column is preferably operated under such conditions that the temperature of the breakpoint (the zone in the column where the temperature gradient is greatest) is preferable in the range of 56° C. to 70° C., most advantageously 59° C. to 61° C. The breakpoint is preferably below the formaldehyde feedpoint on the column.

In accordance with another, less preferred, aspect of this invention, I have found that the acetone entrainment column, operating at atmospheric pressure, or at pressures in the neighborhood of atmospheric pressure as discussed above, may be used for the removal of impurities and substantially all the water from vapors containing a relatively large proportion of water. For example, when aqueous 20% formaldehyde was vaporized and fed to the acetone entrainment tower, using a partial condenser, both tower and condenser being operated at atmospheric pressure, the ratio of formaldehyde to water in the overhead vapors leaving the condenser was about 100:0.965 and the formaldehyde was recovered substantially quantitatively overhead. The process of this invention may be used to remove water from aqueous formaldehyde containing as much as 100 parts of water per part of formaldehyde.

The following examples are given to illustrate this invention further:

*Example I*

In a steady state process, a vapor stream containing 50% acetone, 23% water and 26% formaldehyde is continuously fed from a concentration zone to the 15th tray of a 30 tray acetone entrainment column equipped with a partial condenser arranged to receive the overhead vapors and operated at atmospheric pressure overhead, said column also having a reboiler at its base. Condensate from said partial condenser containing 98% acetone, 0.5% water and 1.5% formaldehyde is fed in a continuous stream to the top tray of said entrainment column at a rate sufficient to maintain the 15th tray (feed tray) of said entrainment column from 60° to 70° C. Such a feed tray temperature is maintained by feeding said condensate at a rate three times the rate of the vapor stream feed. From the base of the column which is at about 108° C., there is drawn off a liquid residue of dilute aqueous formaldehyde containing minor amounts of color-forming impurities, while from the 3rd tray of column 18, at a temperature of about 80° C., there is drawn off a liquid sidestream containing colored impurities; the rate of withdrawal of this sidestream is about 2% of the vapor stream fed to said column.

The overhead vapor from the top of the column at a temperature of 56° C. is passed, without any substantial change in temperature, through a partial condenser maintained at a temperature of 50° C., where a sufficient amount of the vapor is condensed and returned in a continuous stream as the acetone containing liquid feed to said column to supply said acetone containing feed at a rate three times that of the vapor stream feed. The vapors leaving the partial condenser contain 85% acetone, 15% formaldehyde and 0.1% water.

*Example II*

In a steady state process, a vapor stream containing 20% formaldehyde and the remainder water is fed in a continuous stream at a rate of 286 ml. per hour to the 25th tray of a 42 tray acetone entrainment column equipped with a partial condenser arranged to receive the overhead vapors and a reboiler at its base and operated at atmospheric pressure overhead. Liquid acetone is supplied continuously to the top tray of the column at the rate of 137 ml. per hour. From the base of said column, which is at 102° C., there is drawn off a liquid residue of dilute aqueous formaldehyde containing minor amounts of color-forming impurities. The overhead vapor from the top of the column at a temperature of 54° C. is passed with substantially no change in pressure, through a partial condenser maintained at a temperature of 38° C., where 95% of the vapor is condensed to a liquid containing 92% acetone, 3.1% methanol, 4.5 formaldehyde and 0.02% water. This liquid is returned in a continuous stream to the top tray of said column at the rate of 5750 ml. per hour. The vapors leaving the partial condenser contain 60% acetone, 40% formaldehyde and 0.025% water. A liquid sidestream containing impurities is withdrawn from the 15th tray. The sidestream is withdrawn at a temperature of 61° C. and a rate equivalent to 2% of the vapor feed stream to the column.

While the description has referred to the use of distillation columns having trays, it will be understood that there may be employed the well known columns in which the separate trays are replaced by packing. The term "top tray" as used herein will, in that case designate the uppermost portions of the packing.

It is to be understood that the foregoing detailed description is given merely by way of illustration and that many variations may be made therein without departing from the spirit of this invention.

The embodiments of the invention in which an exclusive property or privilege is claimed are defined as follows:

1. A process for the removal of impurities and water from aqueous formaldehyde comprising continuously feeding vaporized aqueous formaldehyde to an intermediate point which point has a temperature less than 70° C. of a fractional distillation zone operating at an overhead pressure of about atmospheric to about 8 p.s.i.g., continuously supplying an acetone containing liquid to a higher point of said zone, continuously withdrawing an aqueous residue low in formaldehyde and containing said impurities from said zone at a point below said intermediate point, continuously maintaining the mole ratio of acetone to formaldehyde in said zone at at least about one to one by maintaining the ratio of liquid acetone recycled to vaporous formaldehyde feed at at least about 15 to one and continuously taking overhead vapors at a temperature up to about 100° C. (at 40 p.s.i.g.) comprising acetone, formaldehyde and water, the ratio of water:formaldehyde in the vapors taken overhead being less than that of water:formaldehyde in the vapors being fed to said zone.

2. The process as set forth in claim 1 in which said distillation zone is maintained at an overhead temperature in the range of about 56 to 70 ° C.

3. The process as set forth in claim 1 in which said overhead vapors are then partially condensed to decrease the proportion of water in said vapors.

4. A process for producing substantially anhydrous pure formaldehyde which comprises continuously feeding vaporized aqueous formaldehyde to an intermediate point which point has a temperature less than 70° C. of a fractional distillation zone maintained at about atmospheric pressure, continuously supplying an acetone containing liquid to a higher point of said zone, continuously withdrawing an aqueous residue from said zone at a point below said intermediate point, continuously feeding the overhead vapors at a temperature up to about 100° C. (at 40 p.s.i.g.) produced to a partial condenser to condense any remaining water and continuously maintaining the mole ratio of acetone to formaldehyde in said zone at at least about one to one by maintaining the ratio of liquid acetone recycled to vaporous formaldehyde feed at at least about 15 to one and continuously taking from said partial condenser vapors comprising acetone and formaldehyde, the amount of acetone supplied being sufficient to maintain the intermediate point at or below 70° C.

5. The process set forth in claim 4, wherein from 15 to 20 parts of acetone are supplied for every part of formaldehyde in the aqueous feed.

6. A process for the removal of impurities and water from aqeous formaldehyde comprising treating aqueous formaldehyde in a concentration zone to produce vapors in which the ratio of formaldehyde to water is at least about 1:100 continuously feeding said vapors to an intermediate point which point has a temperature less than 70° C. of a fractional distillation zone operating at an overhead pressure of about atmospheric to about 8 p.s.i.g., continuously supplying an acetone containing liquid to a higher point of said zone, continuously maintaining the mole ratio of acetone to formaldehyde in said zone at at least about one to one by maintaining the ratio of liquid acetone recycled to vaporous formaldehyde feed at at least about 15 to one, continuously withdrawing an aqueous residue low in formaldehyde and containing said impurities from said zone at a point below said intermediate point, and continuously taking overhead vapors at a temperature up to about 100° C. (at 40 p.s.i.g.) comprising acetone, formaldehyde and water, the ratio of water:formaldehyde in vapors taken overhead being less than that of water:formaldehyde in the vapors being fed to said zone.

7. The process set forth in claim 6 in which said overhead vapors are then partially condensed to decrease the proportion of water in said vapors.

8. The process defined in claim 6, wherein the overhead pressure in said distillation zone is atmospheric pressure or lower.

9. The process defined in claim 6, wherein the distillation zone is maintained at an overhead temperature in the range of about 50 to 70° C.

10. The process defined in claim 6 including the further step of continuously removing color bodies and other impurities by withdrawing a sidestream of liquid containing said bodies from said distillation zone below the vapor feed point at a point where said color bodies concentrate.

11. The process set forth in claim 10, wherein said sidestream is withdrawn from a point at or below the breakpoint of said distillation zone.

12. A process for the removal of impurities and water from aqueous formaldehyde comprising treating aqueous formaldehyde in a concentration zone to produce vapors at a temperature up to about 100° C. (at 40 p.s.i.g.) containing acetone and in which the ratio of formaldehyde to water is at least about 1:100, continuously feeding said vapors to an intermediate point which point has a temperature less than 70° C. of a fractional distillation zone operating at an overhead pressure of about atmospheric to about 8 p.s.i.g., continuously taking overhead vapors comprising acetone, formaldehyde and water, partially condensing said overhead vapors to decrease the water and acetone in said vapors, continuously recycling the acetone containing condensate thus produced to a point on said distillation zone higher than said intermediate point, continuously maintaining the mole ratio of acetone to formaldehyde in said zone at at least about one to one by maintaining the ratio of liquid acetone recycled to vaporous formaldehyde feed at at least about 15 to one, and continuously withdrawing an aqueous residue low in formaldehyde and containing said impurities from said zone at a point below said intermediate point, the proportion of water in the vapors taken overhead being less than that of water in the vapor being fed to said zone.

References Cited by the Examiner
UNITED STATES PATENTS

| | | | |
|---|---|---|---|
| 2,565,568 | 8/51 | McCants | 202—42 |
| 2,801,210 | 7/57 | Muller et al. | 202—40 |
| 2,813,134 | 11/57 | Johnson | 202—40 X |

NORMAN YUDKOFF, *Primary Examiner.*